US010996900B2

(12) United States Patent
Mendonsa et al.

(10) Patent No.: US 10,996,900 B2
(45) Date of Patent: May 4, 2021

(54) MULTI-CARTRIDGE CONTROL BOARD WITH CARTRIDGE-EXTERNAL VOICE COIL MOTOR ACTUATOR COMPONENTS

(71) Applicant: Seagate Technology LLC, Cupertino, CA (US)

(72) Inventors: Riyan A. Mendonsa, Minneapolis, MN (US); Brett R. Herdendorf, Mound, MN (US); Jon D. Trantham, Chanhassen, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 293 days.

(21) Appl. No.: 16/284,687

(22) Filed: Feb. 25, 2019

(65) Prior Publication Data

US 2020/0272367 A1 Aug. 27, 2020

(51) Int. Cl.
*G06F 3/06* (2006.01)
*G11B 5/55* (2006.01)

(52) U.S. Cl.
CPC .......... *G06F 3/0686* (2013.01); *G06F 3/0625* (2013.01); *G06F 3/0631* (2013.01); *G06F 3/0689* (2013.01); *G11B 5/5569* (2013.01)

(58) Field of Classification Search
None
See application file for complete search history.

(56) References Cited

U.S. PATENT DOCUMENTS 4,346,416 A 8/1982 Riggle et al.
4,675,856 A 6/1987 Rudy et al.
4,937,690 A 6/1990 Yamashita et al.
5,664,284 A 9/1997 Brzoska
6,636,778 B2 10/2003 Basham et al.
6,957,291 B2 10/2005 Moon et al.
8,620,640 B2 12/2013 Sandorfi et al.
9,183,087 B2 11/2015 DeCenzo
10,467,172 B2 * 11/2019 Shaw, II ............. G06F 13/4068
10,818,318 B2 * 10/2020 Herdendorf .......... G11B 15/682
10,902,879 B2 * 1/2021 Mendonsa ............ G06F 3/0611
2015/0362968 A1 12/2015 Jurey et al.
2016/0253108 A1 9/2016 Jurey et al.
2017/0242613 A1 8/2017 Shaw, II et al.

FOREIGN PATENT DOCUMENTS

KR 100630739 B1 10/2006

* cited by examiner

*Primary Examiner* — Carlos Garcia
(74) *Attorney, Agent, or Firm* — Holzer Patel Drennan

(57) ABSTRACT

An implementation of a system disclosed herein includes a control board including multiple cartridge slots and hardware for coupling each of the multiple cartridge slots to an associated storage cartridge. The system further includes multiple voice coil motor (VCM) actuator components mounted to the control board, each one of the multiple VCM actuator configured to contribute to an electromagnetic interaction that drives movement of an actuator arm within a storage cartridge coupled to one of the multiple cartridge slots.

20 Claims, 6 Drawing Sheets

200

200 252 246 242 240 256 216 206 204 226 236 208 238 248 244 250 218 228 210 212 214 220 222 224

Power Cntrl 262

Drive Access Cntrl 258

VCM Signal Direction Slctr 264

Switch Cntrl 260

MULTI-CARTRIDGE CONTROL BOARD WITH CARTRIDGE-EXTERNAL VOICE COIL MOTOR ACTUATOR COMPONENTS

SUMMARY

An implementation of a system disclosed herein provides a control board including multiple cartridge slots and hardware for coupling each of the multiple cartridge slots to an associated storage cartridge. The control board includes one or more voice coil motor (VCM) actuator components mounted to the control board that each contribute to an electromagnetic interaction that drives movement of an actuator arm of a storage cartridge coupled to one of the multiple cartridge slots. These and various other features and advantages will be apparent from a reading of the following detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTIONS

Figure 1:
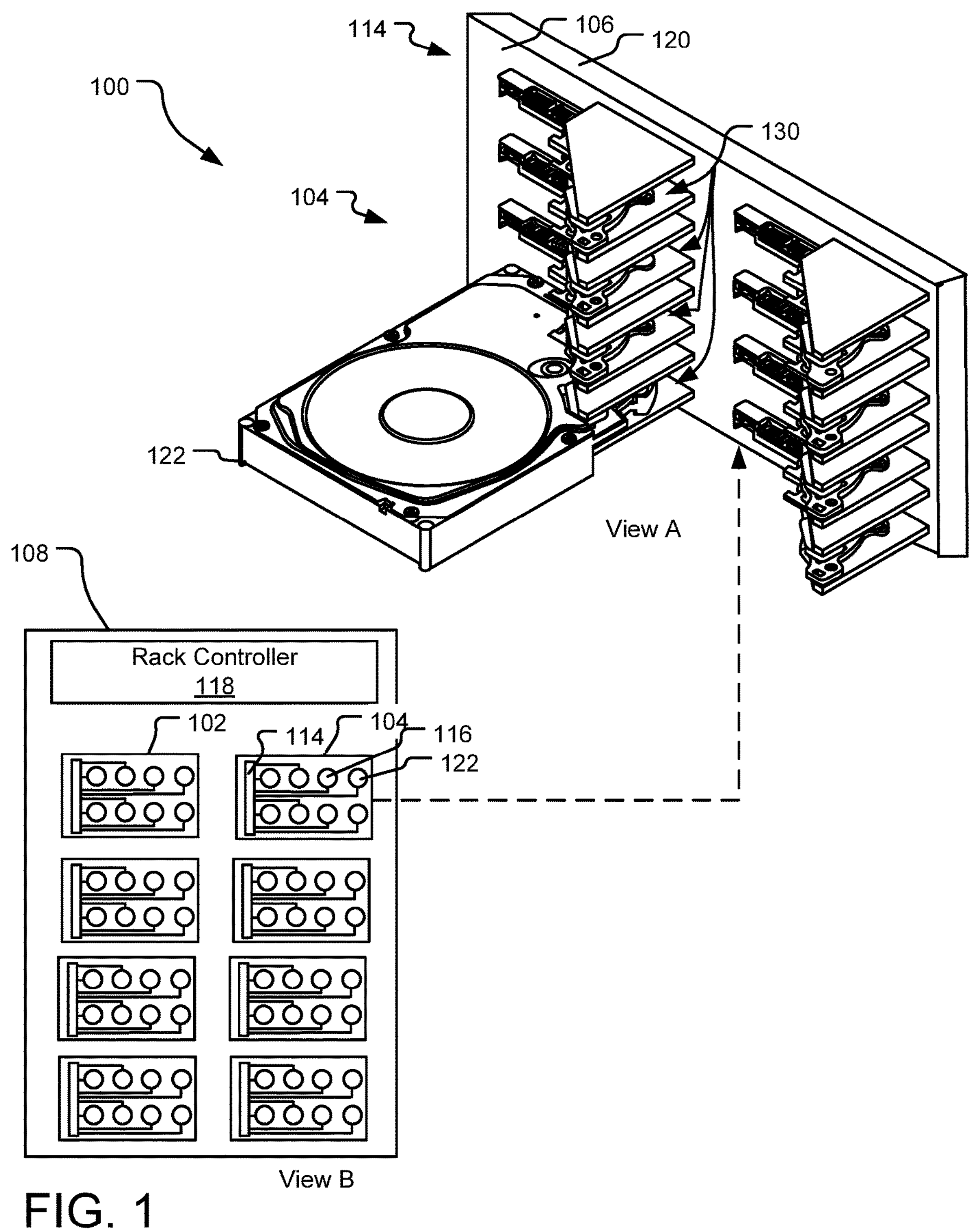
FIG. 1 illustrates an example off-line mass data storage system with multiple media units that each include multiple storage resources sharing a set of a shared control electronics.

Efficient use of power is an important aspect of running data storage devices, especially in embodiments such as a data center environment designed to serve as a public or private cloud storage system. On-line mass data storage (sometimes referred to as secondary or cloud storage) refers to one or more interconnected data storage units that are actively running and available for data access operations (i.e., read and/or write operations). Example on-line mass data storage units include hard disk drives ("HDDs"), optical drives, solid state drives ("SSDs"), and flash memory. Typically, time to data ("TTD") for on-line mass data storage units is less than 2 milliseconds. On-line mass data storage benefits from very high TTD capabilities, but is expensive to build and operate. More specifically, individual on-line mass data storage units are typically of a relatively high quality, driving build costs up. The individual on-line mass data storage units also consume significant power in an on-line state, driving operating costs up.

Near-line (or near on-line) mass data storage refers to one or more interconnected data storage units that are powered on, but kept a low power consumption state when not in use and brought to an on-line state before running data access operations. Hard disk, optical, and/or flash memory drives may be used for near-line storage, with an additional mechanism to bring a selected storage unit to an on-line state for data access operations. Such example mechanisms are robotic near-line storage (i.e., the system is aware of where a desired data chunk resides on a physical volume and utilizes a robotic mechanism to retrieve the physical volume for data access operations) and HDD near-line storage (e.g., a massive array of idle drives ("MAID")). MAID systems archive data in an array of HDDs that are operating in a standby power state, most of which are not spinning. The MAID system spins up each HDD on demand when desired to perform data access operations on a disk within that drive. Typically, TTD for MAID-type near-line mass data storage units is less than 4 milliseconds. Near-line mass data storage systems have lower operating costs than on-line mass data storage systems due to the reduced power demand, but may have similar build costs.

Off-line (or cold) mass data storage refers to one or more interconnected data storage units that are kept in a power off state and/or utilize remotely located storage media to store data. Typically, off-line mass data storage utilizes one or more interconnected tape drives, each with numerous tapes associated with the drive. As discussed above with regard to robotic near-line storage, a desired tape is retrieved from its storage location and loaded into its associated drive for data access operations. In off-line tape mass data storage units, the desired tape is often manually retrieved and loaded. As a result, TTD for off-line tape mass data storage units can be greater than 24 hours. While the build and operating costs of off-line tape mass data storage are low, some applications require a faster access time than 24 hours, but not as fast as on-line or near-line mass data storage systems.

The disclosed off-line HDD mass data storage systems can achieve TTD much faster than that of off-line tape mass data storage while maintaining build and operating costs competitive with off-line tape mass data storage. This is accomplished, in part, with a common controller operating multiple storage resources via an array of switches in a mass storage system.

According to one implementation of the disclosed technology, shared control electronics are integrated on a control board, which is a printed circuit board assembly (PCBA) including control electronics. The control electronics are coupled to each of multiple slots (ports) serving an electrical and mechanical interface for coupling a storage device to each of the respective slots. In some embodiments, the slot is known as a cartridge slot with each designed to receive, support, and electrically couple a corresponding storage device characterized as a cartridge to the shared control electronics on the control board. The control board further includes magnets mounted in proximity to the various cartridge slots so as to provide the requisite magnetic field component of a voice coil motor (VCM) used to drive an actuator arm within each respective cartridge. In some implementations, the magnets are sized, shaped, and placed to provide mechanical support for the respective cartridges (e.g., to act as a structural carrier) so as to reduce system component costs by replacing traditional mounting hardware that would otherwise be integrated in addition to VCM magnets.

Consistent with that described above, each portable storage cartridge in the present system as embodied herein resembles a hard disc drive (HDD), but without certain mechanical and electrical features that would otherwise be necessary to enable the cartridge to operate in a stand-alone fashion. Each cartridge thus generally takes the form of an HDD minus control electronics, the VCM magnets, and/or other elements that can be offloaded from the cartridge and supplied by the access station. The removal of these elements from the individual cartridges allows the provisioning of a large-scale, high-capacity storage system with the benefits of magnetic disc storage at a significantly lower cost.

FIG. 1 illustrates an example off-line HDD mass data storage system 100 with multiple media units (e.g. media units 102, 104) that each include multiple storage resources sharing a set of a shared control electronics. As used herein, "control electronics" may refer to various device controllers (e.g., microprocessors) as well as various electronics that implement selective decisions of device controllers, including electronics such as switches to select a preamplifier and configure preamplifier settings, switches to open appropriate read/write channels, switches to control the actuator movement for positioning various read/write heads; and/or switches to spin up or down a voice coil motor (VCM) or spindle motor on any one of the HDAs.

The off-line HDD mass data storage system 100 (e.g., a server cluster or farm) includes at least one rack (e.g., a rack 108), and may include multiple racks oriented in adjacent or separate physical locations or facilities. The off-line HDD mass data storage system 100 may accommodate any use of mass data storage (e.g., content delivery, backup, archiving, etc.).

Individual racks, such as the rack 108, may be interconnected to one another via a computer network (not shown), such as Ethernet or a custom interconnect network. Further, the storage racks may be connected to one or more external data source(s) and/or destination(s) via a local area network ("LAN") or a wide area network ("WAN"). Communication between the storage racks (e.g., the rack 108), various computer networks, and the external data source(s) and/or destination(s) may occur using a variety of communication protocols (e.g., transmission control protocol/internet protocol ("TCP/IP"), packet over synchronous optical networking/synchronous digital hierarchy ("SONET/SDH"), multiprotocol label switching ("MPLS"), asynchronous transfer mode ("ATM"), Ethernet, and frame relay). As a result, data may be accessed and moved between the individual storage racks and external data source(s) as desired.

The rack 108 includes an array of media units, such as the media units 102 and 104. Each media unit is selectively powered by one or more power supplies and coupled to a rack controller (e.g., a rack controller 118). By example and without limitation, the storage rack 108 is shown to include 8 individual media units (e.g., media units 102, 104) all of which are configured to receive power control and read/write instructions from the rack controller 118. In other implementations, some racks may not include a rack controller at all. The exact number of media units and power supplies within any given rack may vary considerably from one implementation to another and from one rack to another.

Each of the media units (e.g., 102, 104) in the off-line HDD mass data storage system 100 includes a plurality of storage cartridges (e.g., cartridges 116, 122) that removably couple to a shared set of control electronics also referred to herein as a "control board" (e.g., a control board 114). The control board 114 is, in one implementation, an interconnect 106 coupled to a printed circuit board assembly (PCBA 120) supporting a set of control electronics (not shown) shared by each of the storage cartridges coupled to the interconnect 106.

In one implementation, each of the storage cartridges within the media unit 104 is a distinct storage medium or set of storage media with certain read/write control removed from the cartridge (e.g., as in a traditional storage drive) and to the control board 114 and/or the rack controller 118 of the off-line HDD mass data storage system. As a result, one or both of the control board 114 and/or the rack controller 118 can selectively power (e.g., power-on, power-off, spin-up, spin-down, etc.) an individual storage cartridge as desired to read data from and/or write data to the cartridge without having to supply power to all storage drives within the off-line HDD mass data storage system 100 continuously.

In one implementation, the rack controller 118 is communicatively coupled to the each of the control boards (e.g., the control board 114) within the corresponding rack 108, and the control boards are each communicatively coupled to the associated nest of storage cartridges. Communication between the rack controllers and the control boards is digital or primarily digital, and accomplished via signal transmission through various compute nodes, inter-integrated circuits ("I2C"), serial advanced technology attachment ("SATA"), serial attached small computer system interface ("SAS"), universal serial bus ("USB"), peripheral component interconnect express ("PCIe"), Ethernet, wireless channels, etc.

Although other implementations may differ, the media units (e.g., 102, 104) of FIG. 1 each include eight cartridge slots that may be selectively coupled to a portable storage cartridge (e.g., the cartridge 122). View A illustrates the media unit 104 in greater detail with 7 of the 8 storage cartridges removed from associated slots (e.g., slots 130) in the interconnect 106. In addition to the slots 130, the interconnect 106 includes various hardware (e.g., supporting flanges 132) that provides the requisite mechanical support for the portable storage cartridges as well as the requisite electrical couplings between each of the portable storage cartridges and the shared control electronics on the PCBA 120.

In one implementation, the shared control electronics on the PCBA 120 include one or more controllers, such as one or more peripheral interface controllers ("PICs"), application-specific integrated circuits ("ASICs") and/or systems on chips ("SoCs"). Such controllers may be further connected to an array of switches (not shown) on the control board 114 that communicatively couple to control board 114 to the individual cartridges (e.g., the cartridge 122) through the interconnect 106. The control board 114 may additionally integrate various switches, memory (e.g., storing firmware), power supplies, and other electronics for controlling power and access to (e.g., read write access) each of eight cartridges that removably couple to the control board 114.

This above-described system configuration permits the individual storage drives in the media unit 102 to be individually removed, serviced, and/or replaced without affecting a flow of data to or from to any of the other storage drives sharing the same control electronics (e.g., the components of control board 114).

In one implementation, each portable storage cartridge (e.g., the cartridge 122) includes a housing which encloses at least one rotatable magnetic recording medium (disc) and at least one data read/write transducer (head). In some embodiments that housing may be a sealed housing. Each head is configured to be aerodynamically supported adjacent a magnetic recording surface of the corresponding disc by atmospheric currents established by high velocity rotation of the disc. The head(s) are radially advanced across the recording surface(s) using an actuator arm. The heads are configured to write data to data tracks defined on the recording surfaces. Each combination of head and disc surface is referred to as a head-disc interface (HDI), so the cartridges of the present disclosure can be characterized as HDI cartridges each having at least one HDI. The housing of each cartridge protects the HDI(s) from contaminants that may interfere with the operation of the cartridge. In some embodiments where environmental controls are sufficiently in place to guard against contaminants, the cartridge may comprise no housing such that the internal discs of one cartridge are exposed to the same environment as the internal discs of other cartridges in the system.

Among other electrical and hardware support components, the interconnect 106 includes VCM magnets (not shown) external to the various storage cartridges and positioned to provide a magnetic field component to power a corresponding voice coil motor used to rotate an actuator arm within one or more of the storage cartridges. In one implementation, each storage cartridge (e.g., the cartridge 122) includes an internal voice coil that is, in operation, influenced by a magnetic field generated by a pair of magnets on the control board (e.g., one above the associated cartridge slot and one below the associated slot). The voice coil is powered by the interaction of a current passed through the coil and a permanent magnetic field that is supplied by the adjacent pair of VCM magnets mounted to the control board 114. In one implementation, the VCM magnets on the control board 114 are sized and positioned such that some of the magnets can be shared between two adjacent cartridges. In another implementation, the VCM magnets are not shared between the adjacent cartridges and there exists a different pair of magnets to provide the magnetic field each individual cartridge. For example, magnetic shielding elements may be interleaved between each one of the cartridge slots to separate magnets contributing to the first cartridge A few exemplary magnet positions and slot positions are shown and discussed in greater detail with respect to FIGS. 2-4.

In one implementation, the control board 114 is designed to access (e.g., read from or write to) only one of the communicatively coupled storage cartridges at a time. For example, the control board 114 of the media unit 104 may implement selective power rules that prohibit simultaneous access to multiple cartridges coupled to the control board 114. Applying such rules, the control board 114 may, for example, selectively power on the cartridge 122 for a data access operation without powering on the remaining seven cartridges coupled to the interconnect 106. At the conclusion of the data access operation directed to the cartridge 122, the cartridge 122 is powered off. Provided that no two adjacent cartridges of a same media unit are active at the same time, there are no complications (e.g., read/write errors) caused by magnetic interference between VCMs of adjacent cartridges.

Figure 2:
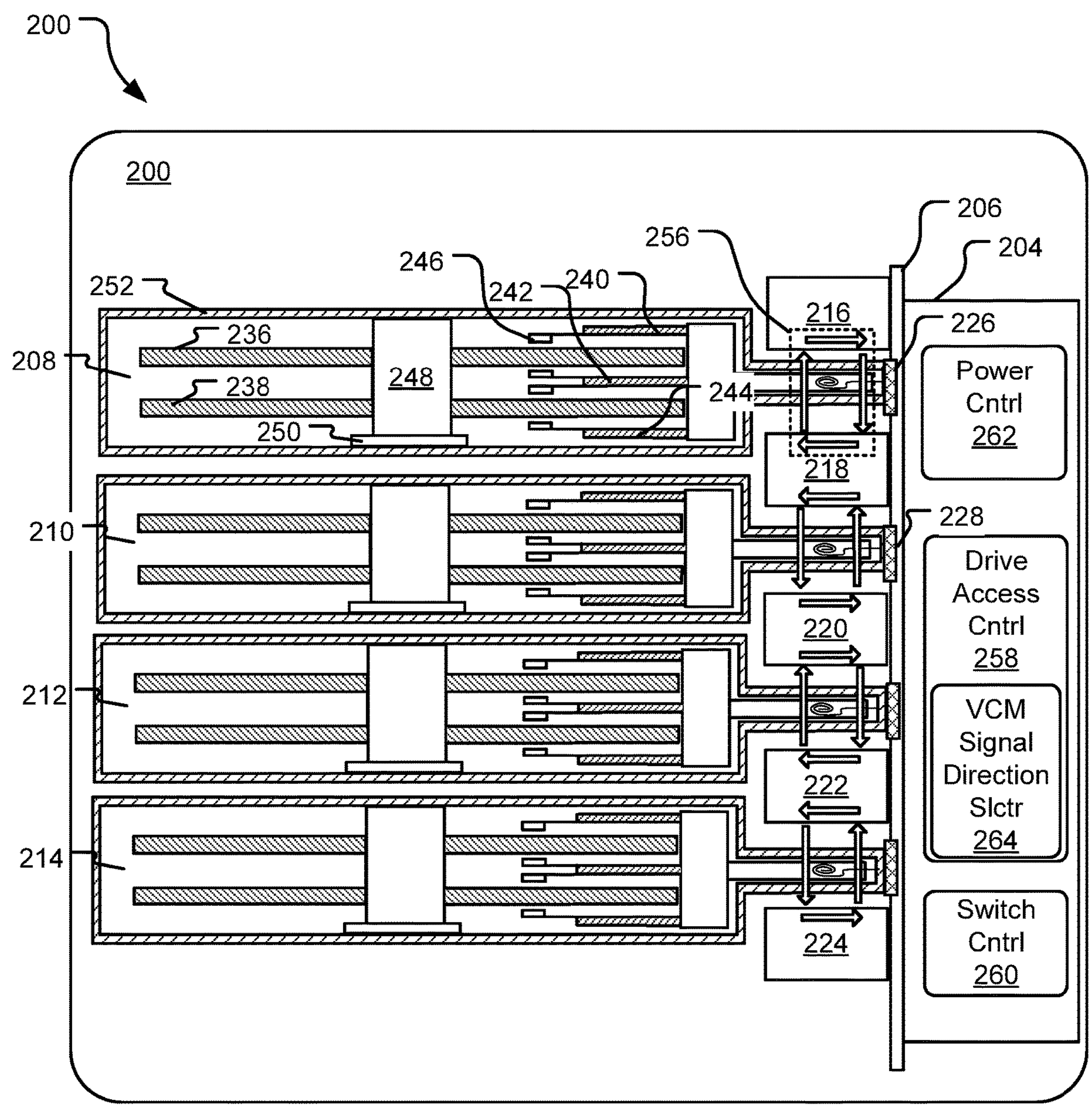
FIG. 2 illustrates a cross-sectional view of a media unit including a control board adapted to selectively power and access each of a number of portable storage cartridges.

FIG. 2 illustrates a cross-sectional view of a media unit 200 including a control board 204 adapted to selectively power and access each of a number of portable storage cartridges 208, 210, 212, and 214. Each of the storage cartridges 208, 210, 212, and 214 is removably coupled to the control board 204 through one of multiple cartridge slots (e.g., a slot 226) in an interconnect portion 206 of the control board 204. For conceptual simplicity, FIG. 2 omits some of the hardware elements used to provide mechanical support for each of the slot couplings.

In one implementation, the media unit 200 is implemented in a rack with a number of other identical or non-identical media units, as generally discussed above with respect to FIG. 1. The interconnect portion 206 of the control board 204 includes multiple magnets 216, 218, 220, 222, and 224 distributed across the control board 204 such that each of the cartridge slots (e.g., slots 226, 228) is positioned below a corresponding upper magnet and above a corresponding lower magnet. For example, the cartridge 210 is shown positioned in slot 228, which rests above a lower magnet 220 and below an upper magnet 218. The cartridge 210 includes a voice coil 234 that is positioned within a magnetic field created by the upper magnet 218 and the lower magnet 220. This magnetic field interacts with the electric field of current moving through the voice coil 234 (a voice coil signal) from the control board 204, and the interaction results in a Lorentz force that pivots an actuator arm in the cartridge 210 to a predetermined radial position. In traditional storage devices, VCM magnets are included internal to each storage device enclosure. Removing these magnets to an external position (as shown in FIG. 2) provides several advantages, discussed below.

When the VCM magnets are distributed as shown, the magnetic field of each individual VCM magnet may provide a magnetic field that drives the voice coil motor of two different adjacent storage cartridges positioned in two directly adjacent cartridge slots. For example, the magnet 218 contributes to the permanent magnetic field affecting the cartridge slot 226 and also to the permanent magnetic field affecting the adjacent cartridge slot 228. This configuration allows for a reduction in the number of magnets needed to support VCM functionality across the collection of storage cartridges that are simultaneously coupled to the media unit 200. For example, allowing the magnetic field of the magnet 220 to power the VCMs of both the above and below cartridges (e.g., cartridges 208 and 210) allows two cartridges to operate on three magnets instead of four, significantly reducing manufacturing costs. Additionally, mounting the VCM magnets on the interconnect portion 206 of the control board 204 instead of a position internal to each of the storage cartridges allows the magnets to be used as weight-bearing hardware couplings to support each cartridge, allowing for the omission of a collection of certain hardware components that might otherwise be used to support the weight of the storage cartridges coupled to the control board 204.

In another implementation, the VCM magnets are not shared between adjacent cartridges. For example, two magnets may be included in place of the VCM magnet 218—one to supply a magnetic field to the cartridge 208 and another to supply a magnetic field for the cartridge 210.

When coupled to an associated cartridge slot on the interconnect portion 206 of the control board 204, each of the cartridges 208, 210, 212, and 214 is adapted to receive hardware control signals (e.g., power signals, read/write signals) from various electronics on the control board 204. As used herein, the term "hardware control signals" refer to analog control signals, such as signals send from a microprocessor or chip to a hardware component that lacks processing capability. For example, the cartridges may each receive power signals (e.g., VCM control and spindle motor control) through the interconnect 206 as well as read data to write to target storage positions on each cartridge. When data is read back from the storage cartridges, the read data is flowed to the electronics on the control board.

Although other implementations are contemplated, each of the storage cartridges 208, 210, 212, and 214 of FIG. 2 is shown to include a housing 252 that encases two magnetic recording discs 236, 238, three actuator arms 240, 242, and 244 and four heads (e.g., a head 246) provide a total of four HDIs. Any respective numbers of these respective elements can be used as desired, so long as there is at least one disc surface and one associated head to provide at least one HDI within the cartridge. Within each storage cartridge (e.g., 208), the two discs 236, 238 are mounted to a disc hub assembly 248 that is rotated by a spindle motor 250.

When a non-magnetic (e.g., paramagnetic) material is used for the housing 252 of each storage cartridge, a magnetic circuit 256 is established through the interaction between the magnetic fields generated by the voice coil 234 and the externally supplied magnetic field of the magnets 216, 218 to position the heads (e.g., the head 246) within each storage cartridge. One notable effect of sharing magnets between cartridges (as shown) is that the direction of the permanent magnetic field is reversed in each alternating slot on the interconnect. For example, the two magnets 216 and 218 generate a clockwise magnetic field within the slot 226 while the magnets 218 and 220 generate a counterclockwise magnetic field within the slot 228. To account for this difference in magnetic field direction, the control board 204 may include a VCM current signal direction selection mechanism (e.g., VCM signal direction selector 264) that selects a phase signal direction for the VCM control signal provided to each cartridge slot (e.g., slots 226, 228) based on the magnetic field direction from the associated upper and lower magnets. This mechanism is discussed in greater detail below.

By example and without limitation, the control board 204 is shown to include a drive access controller 258 including a VCM signal direction selector 264, a switch controller 260, and a power controller 262. Each of these controllers may include software and/or a collection of hardware and software for executing commands from a host and/or independent of the host, such as firmware commands stored in memory (e.g., DRAM) (not shown) on the control board 204.

The drive access controller 258 performs data access operation, which includes actions such as transmitting write data to a select drive through an associated preamplifier switch (not shown), receiving read data back through a read/write switch (not shown), and commanding the power controller 262 to generate and transmit the appropriate voice coil motor (VCM) and spindle motor power signals to support each read and write operation. Each time a drive access command is initiated, the drive access controller 258 transmits a power-up command to the power controller 262 specifying a target one of the cartridge slots (e.g., 226, 228, etc.) corresponding to a target storage cartridge for the data access operation. The VCM signal direction selector 264 determines a physical index of the specified one of the cartridge slots and uses this physical index to select a direction that the power controller 262 uses when generating the voice coil power signal.

In one implementation, the VCM signal direction selector 264 accesses a stored map associating a direction of magnetic field flow in the vicinity of each of the cartridge slots (e.g., 226, 228) with a predefined signal direction. For example, the VCM signal direction selector 264 may access such a map to determine that cartridge slot 226 is associated with a negative voice coil current while the cartridge slot 228 is associated with a positive voice coil signal direction. The VCM signal direction selector 264 selects the predefined signal direction that is associated with the physical index of the cartridge slot and provides this value to the power controller 262.

To prevent magnetic interference of the magnetic fields of the VCMs between each adjacent pair of storage cartridges (e.g., cartridges 208, 210), the power controller 230 may implement a selective powering rule that prohibits simultaneous data access operations to storage cartridges positioned in adjacent slots on the control board. In one implementation, the power controller 230 implements a selective powering rule that supports data access (read, write) operations to exclusively one storage cartridge coupled to the control board 204 at a time. Responsive to each read or write operation, an individual target storage cartridge is powered on and spun up. When the read or write operation is completed, the target storage cartridge is powered back off. Notably, the power controller 230 may impose different selective power rules in different implementations depending upon a variety of factors including the strength of the VCM magnets and the proximity of the various cartridge slots to one another.

In addition to the power controller 262 and the drive access controller 258, the control board 204 may also support a switch controller 260. The switch controller 260 receives and executes drive control commands that control some aspect of drive selection and/or drive operation, such as to configure various switches in a switch bank for access to a select cartridge, such as one or more switches to select a preamplifier, switches to open appropriate read/write channels; switches to control the movement of an actuator to position various read/write heads; and/or switches to spin up or down the spindle motor of any one of the storage cartridges.

The above-described implementation provides for a sharing of VCM magnetic between adjacent cartridges such that each individual magnet supplies a magnetic field for two adjacent cartridges. Effectively, this allows for a decrease in the total quantity of VCM magnets needed to operate the media unit 104 (e.g., approximately half as many magnets are utilized as compared to traditional systems where each individual HDD has its own pair of VCM magnets). This significantly reduces system costs and complexity.

Although not shown, some implementations of the control board 204 may include a mechanism that facilitates automatic or manual position adjustments of the individual magnets 216, 218, 220, 222, and 224. For example, insertion of a storage cartridge 208 into the associated slot 226 may actuate a mechanism that draws the pair of magnets 216 and 218 closer to one another and closer to the voice coil 226. In another implementation, a user manually pushes a button or performs other action to initiate adjustment of the various pairs of magnets adjacent to each individual storage cartridge.

Figure 3:
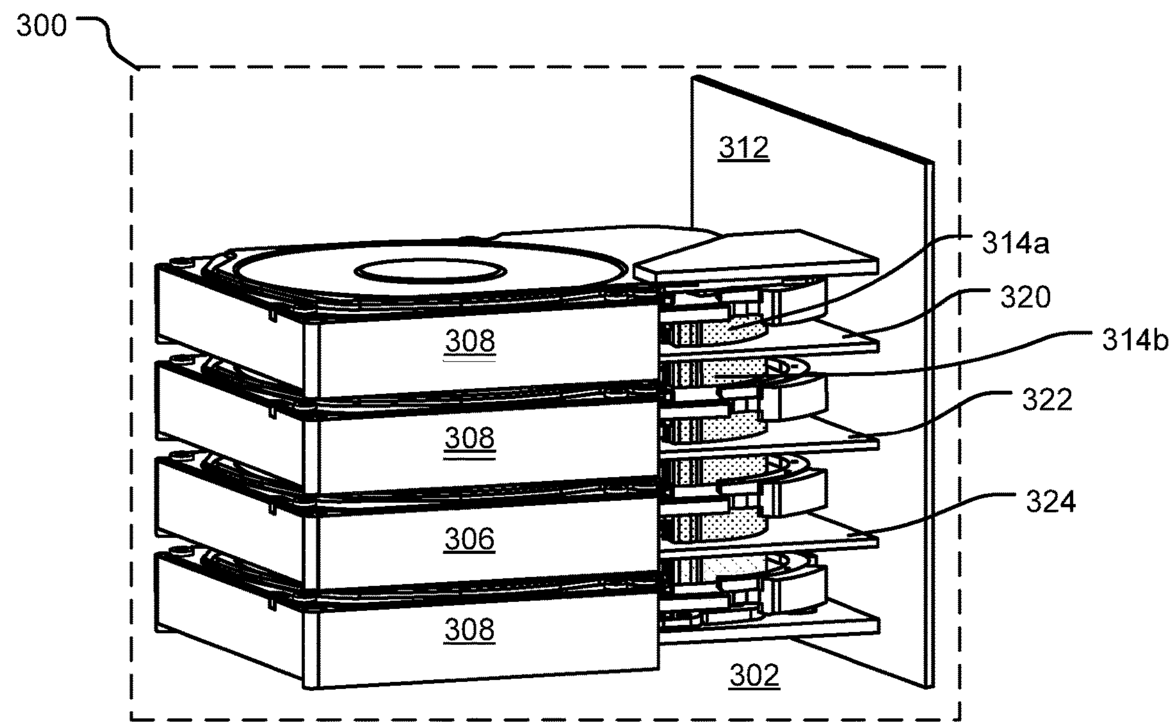
FIG. 3 illustrates a perspective view and a cross-sectional view of an example media unit with storage cartridges sharing voice coil motor (VCM) magnets coupled to a control board.
Figure 3:
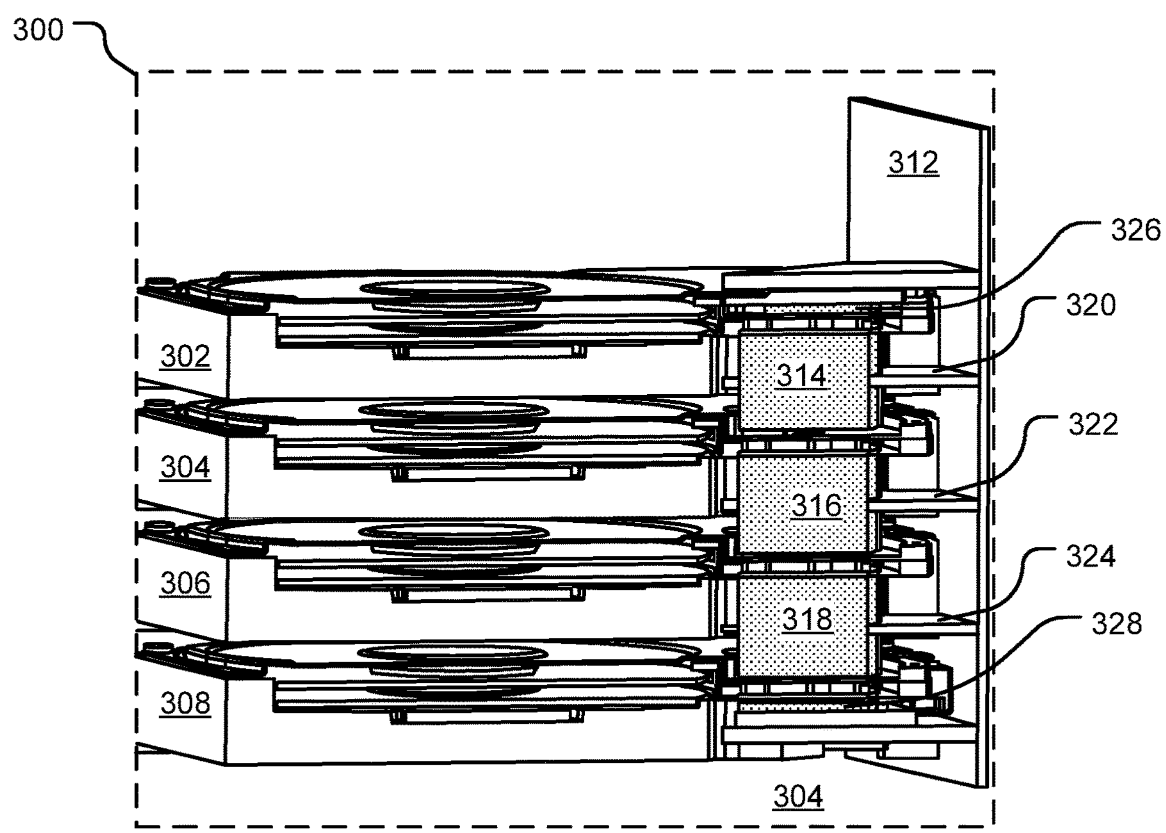

FIG. 3 illustrates a perspective view 330 and a cross-sectional view 304 of an example media unit 300 with a stack of storage cartridges (e.g., 302, 304, 306, and 308) each having a voice coil positioned in a magnetic field generated by a pair of VCM magnets (e.g., VCM magnets 314, 316, 318, 326, and 328) coupled to a control board 312. The perspective view 330 provides an outer view of the storage cartridges 302, 304, 306, and 308 as well double-sided magnet mounts 320, 322, and 324, and magnets between each of the double-sided magnet mounts (e.g., a first magnet 314 comprising sections 314*a*, 314*b*). In the illustrated implementation, the magnets 314, 316, and 318 are shown to be bigger (e.g., taller) relative to the magnets 326 and 328, which are positioned on the ends of the stack. Although the externally-generated magnetic field affecting the voice coil in each of the storage cartridges 302, 304, 306, and 308 may be of approximately equal strength, magnets of variable size, shape, and materials may be chosen for various purposes. For example, the user of the taller magnets 314, 316, and 318 may help to create a desired spacing between the storage cartridges, so as to facilitate easier removal of each individual cartridge from the control board 312.

Referring now to the cross-sectional view 332, it can be seen that each of the three magnets 314, 316, and 318 includes an outward-facing slit that receives a corresponding one of the double-sided magnet mounts 320, 322, or 324. For example, an outward-facing slit of the magnet 314 has been positioned with opposite surfaces in contact with a double-sided magnet mount 320 such that the magnet 314 is suspended with an upper portion (see 314*a* in view 302) resting above the double-sided magnet mount 320 and a lower portion (see 314*b* in view 302) suspended below the double-sided magnet mount 320.

In the arrangement of FIG. 3, each of the magnets 314, 316, and 318 supplies the requisite magnetic field for a VCM motor in the two closest storage cartridges. The magnet 314 contributes to the magnetic field driving the VCMs of both of the cartridges 302 and 304; the magnet 316 contributes to the magnetic field driving the VCMs of both of the cartridges 304 and 306; and the magnet 318 contributes to the magnetic field driving the VCMs of both of the cartridges 306 and 306.

Figure 4:
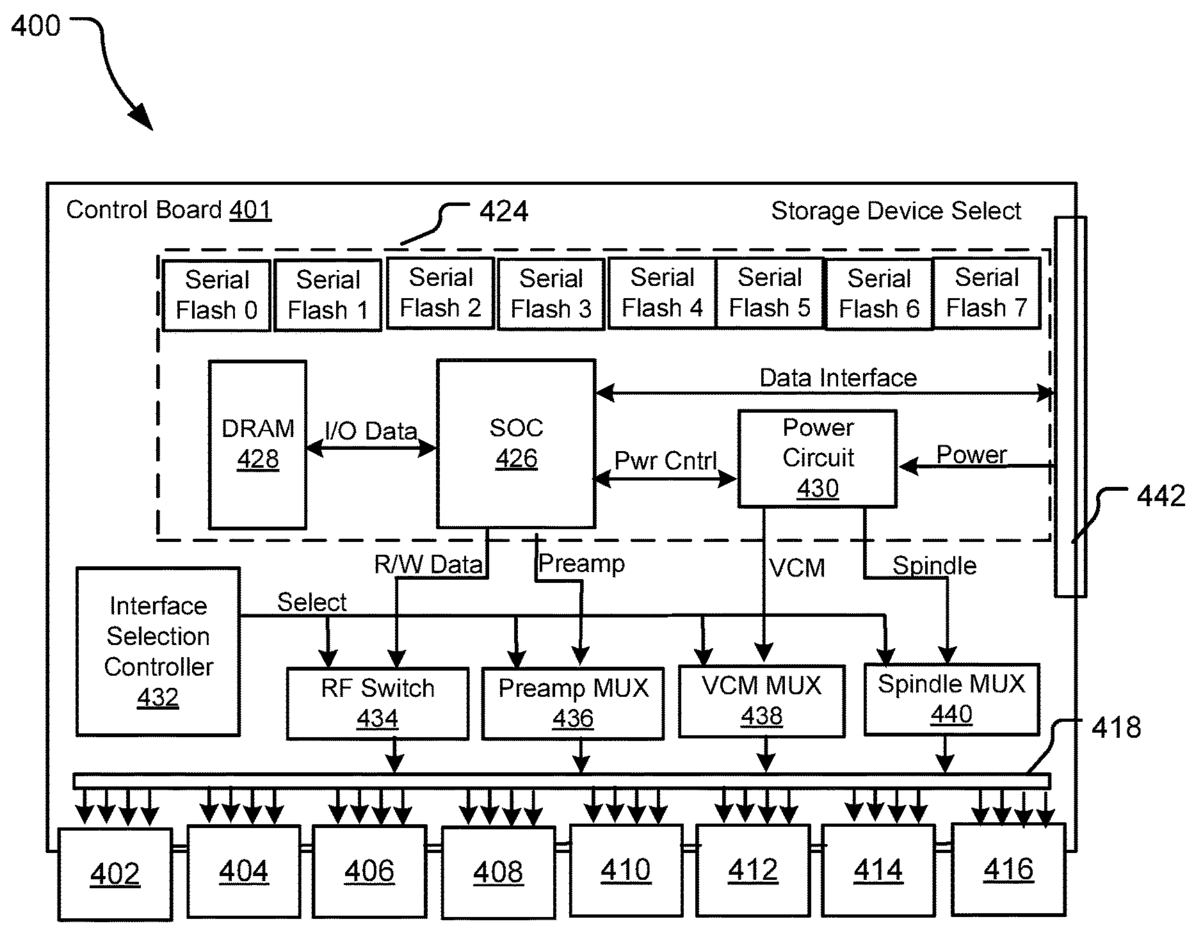
FIG. 4 is a functional block representation of a media unit including a control board providing selective read/write control of various storage cartridges coupled to the control board.

FIG. 4 is a functional block representation of a media unit 400 including a control board 401 providing selective read/write control of various storage cartridges coupled to the control board 401 through an interconnect 418. In the example of FIG. 4, a total of eight (8) storage cartridges 402, 404, 406, 408, 410, 412, 414, and 416 are supported by the control board 401. Other number of storage cartridges, including greater or smaller numbers of HDAs, can be utilized as desired.

The control board 401 includes a consolidated circuit portion 424 that operates to supply the control the electronics to selectively power and control each of the storage cartridges (e.g., 402, 404) in turn. The consolidated circuit portion 424 includes a system on chip (SOC) control circuit 426, memory (DRAM) 428, power control circuitry (power circuit) 430, and local memory devices (serial flash 0-7). In different implementations, other elements may be incorporated into the consolidated circuit 424 in addition to or in lieu of those shown in FIG. 4.

The SOC 426 includes a programmable processing core that utilizes firmware stored in the memory 428 to provide top level control for the respective storage cartridges 402, 404, 406, 408, 410, 412, 414, and 416 (hereinafter, "the storage cartridges"). Although a single set of firmware may be utilized in some implementations, FIG. 4 illustrates an implementation where activation of each of the different storage cartridges is carried out by separately loading firmware from a respective one of the serial flash devices 0-7 into the memory 428. This may, for example, enable the separate storage of parameters, control data, and state information associated with access to each one of the storage cartridges. In other implementations, these parameters, control data, and state information or stored in alternative storage locations.

The control board 401 further incorporates a separate interface control circuit—interface selection processor 432—that utilizes internal programming to act as a switch controller to selectively connect various components to enable data access to each of the storage cartridges to the SOC 426 and power circuit 420 (e.g., enabling access to a select one of the storage cartridges at a time).

The SOC 426 and the interface selection processor 432 each communicate with an external control circuit, such as a host, local server, rack controller, etc. via an interface connector 442. Although not expressly shown in FIG. 4, data link communications may also be carried out between the SOC 426 and the interface selection processor 432.

Responsive to a command from an external host (e.g., from a rack controller or other external host), the interface selection processor 432 performs various switch configuration operations to configure the consolidated circuit 424 for access to a select storage cartridge identified by the command. The interface selection processor 432 configures an RF switch 424 for directing read/write (R/W) data to a select target storage cartridge; configures a preamp mux 436 for directing a preamp signal to the select target; and also configures a VCM mux 428 and a spindle mux 440 for routing the VCM and spindle motor signals to the target drive.

The SOC 428 instructs the power circuit 430 to provide power to the target storage cartridge. In response, the power circuit 430 shunts power from a power supply (not shown) through the VCM mux 438 and the spindle mux 440.

The signal sent through the spindle mux 440 rotates the disc(s) of the select target storage cartridge at a pre-determined rotational velocity and the signal sent through the spindle mux 440 is directed to a voice coil within the select storage cartridge. The interaction of the electric field generated by current movie through the voice coil interacts with the magnetic field of VCM magnets (not shown), creating a force that rotates an actuator arm of the target storage cartridge to position one or more head(s) at a target position to read data from or write data to the disc.

In one implementation, the SOC 428 executes various control modules stored in the memory 428 including a VCM signal direction selector (such as the VCM signal direction selector 264 of FIG. 2). Responsive to receipt of each incoming drive access command, the VCM signal direction selector determines a physical slot index of a target storage drive on the control board 401 and the power circuit 430 generates a voice coil control signal for the target storage drive that has a signal direction based on this determined physical index. For example, the VCM controller may access a map storing each physical drive index in association with a flag indicating a direction of the VCM magnetic field at the position of the target storage cartridge. If the target drive corresponds to a slot within a first subset of the available slots (e.g., odd-numbered slots), the VCM control module generates the VCM signal in a first direction. If the target drive corresponds to a slot within a second subset of the available slots (e.g., even-numbered slots), the VCM module generates the VCM signal in a second, opposite direction.

In addition to commanding the power circuit 430, the SOC 426 performs control actions to carry out each data transfer operation (e.g., a write or read command) to the associated target storage location. In one implementation, the SOC 426 communicates with each of the storage cartridges over an interface (e.g., a SATA, SAS, NVMe) to perform read/write operations to the storage cartridges based on the data, metadata, and/or control information within a data signal from a host (e.g., a rack controller or other external processing entity). Responsive to receive of a read/write command, the SOC 426 identifies a target storage cartridge as well as other addressing information (e.g., head, cylinder, sector, etc.) using suitable data structures. In one implementation, the SOC 426 accesses firmware 462 (e.g., stored in non-volatile memory (FLASH) and/or loaded into dynamic random access memory ("DRAM")) to retrieve operating protocols on a select storage cartridge. To read data from a target storage cartridge, the SOC 426 sends a preamplifier control signal via a serial interface or other command connection through the preamp switch 434 to operate the target storage cartridge. The requested data is then read back to the SOC 426 from the target storage cartridge via a read/write switch 454.

Aspects of the various control electronics of the control board may be implemented in a tangible computer-readable storage media readable by a computing node within or communicatively coupled to the mass data storage system. The term "tangible computer-readable storage media" includes, but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules, or other data resident in a modulated data signal, such as a carrier wave or other signal transport mechanism.

Figure 5:
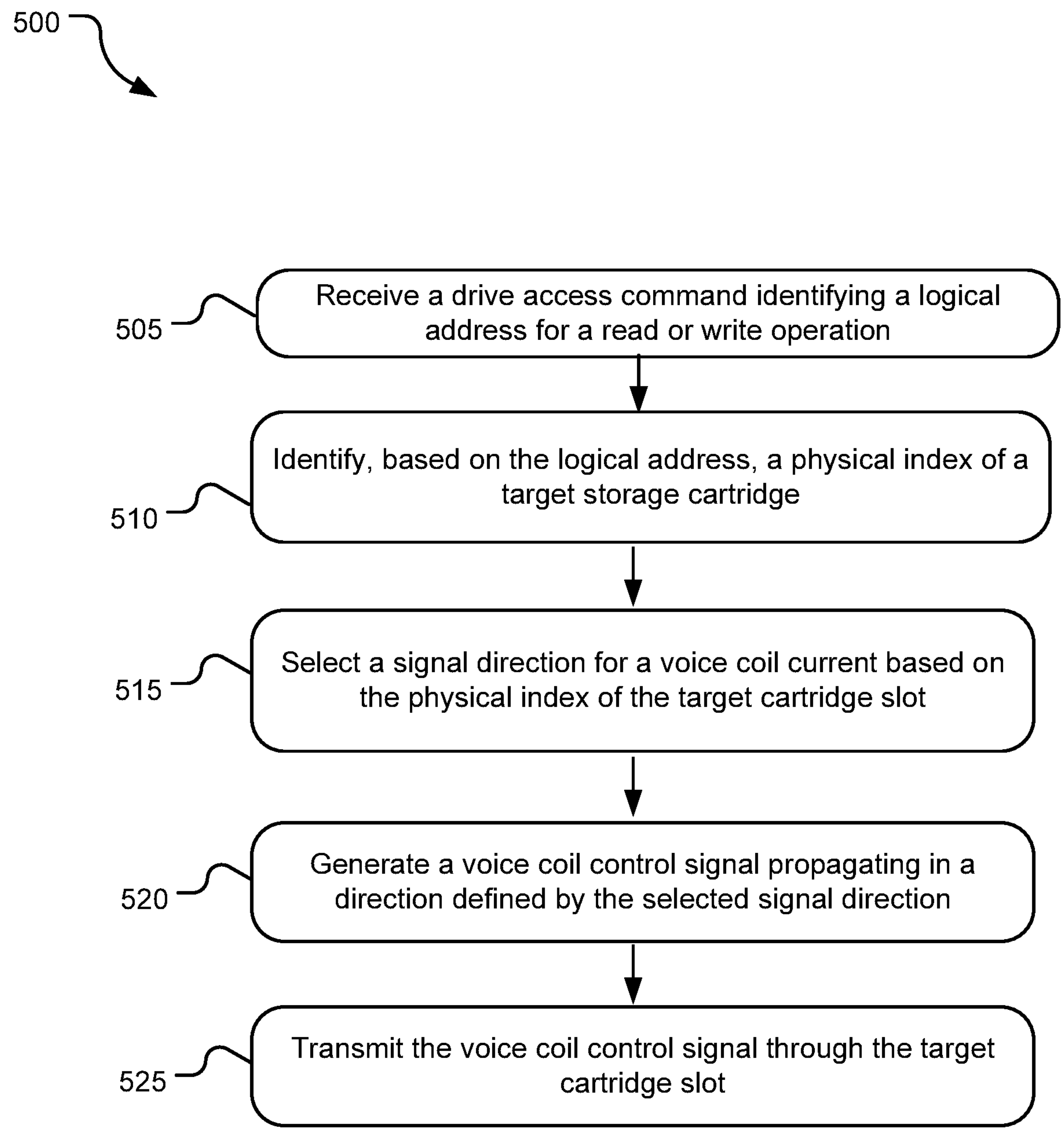
FIG. 5 illustrates example operations for driving read/write operations on various portable storage cartridges coupled to a shared set of control electronics.

FIG. 5 illustrates example operations 500 for driving read/write operations on various portable storage cartridges coupled to a shared set of control electronics. According to one implementation, the control electronics are mounted on a control board including an interconnect that couples the control electronics to each of multiple cartridge slots configured for coupling to an associated portable storage cartridge. In one implementation, each of the cartridge slots on the control board is positioned between a pair of magnets mounted to the control board. When a storage cartridge is positioned within one of the cartridge slots, the two magnets in nearest proximity to the storage cartridge generate a magnetic field that drives a voice coil motor within the storage cartridge and thereby alters radial positioning of a head element to read data from or write data to a storage medium. In one implementation, each individual magnet on the control board provides a permanent magnetic field that is usable to drive the VCMs of the two closest storage cartridges.

At a receiving operation 505, the shared control electronics receive a drive access command identifying a logical address for a read or write operation. An identification operation 510 identifies a physical index of a target storage cartridge coupled to the control board that has physical storage mapped to the logical address identified by the drive access command.

A selecting operation 515 selects a signal direction for a voice coil current based on the determined physical index of the target cartridge slot and an associated direction of the permanent magnetic field in the vicinity of (e.g., passing through) the target cartridge slot. In one implementation, an opposite signal direction is selected for interleaved slots as a result of the sharing of voice coil magnets between adjacent pairs of slots. For example, a positive signal direction may be selected for even-number slots and a negative signal direction may be selected odd-numbered slots.

A voice control signal generation operation 520 generates a voice coil control signal that propagates according to the selected signal direction, and a transmission operation 520 transmits the generated voice coil control signal through the target cartridge slot.

Figure 6:
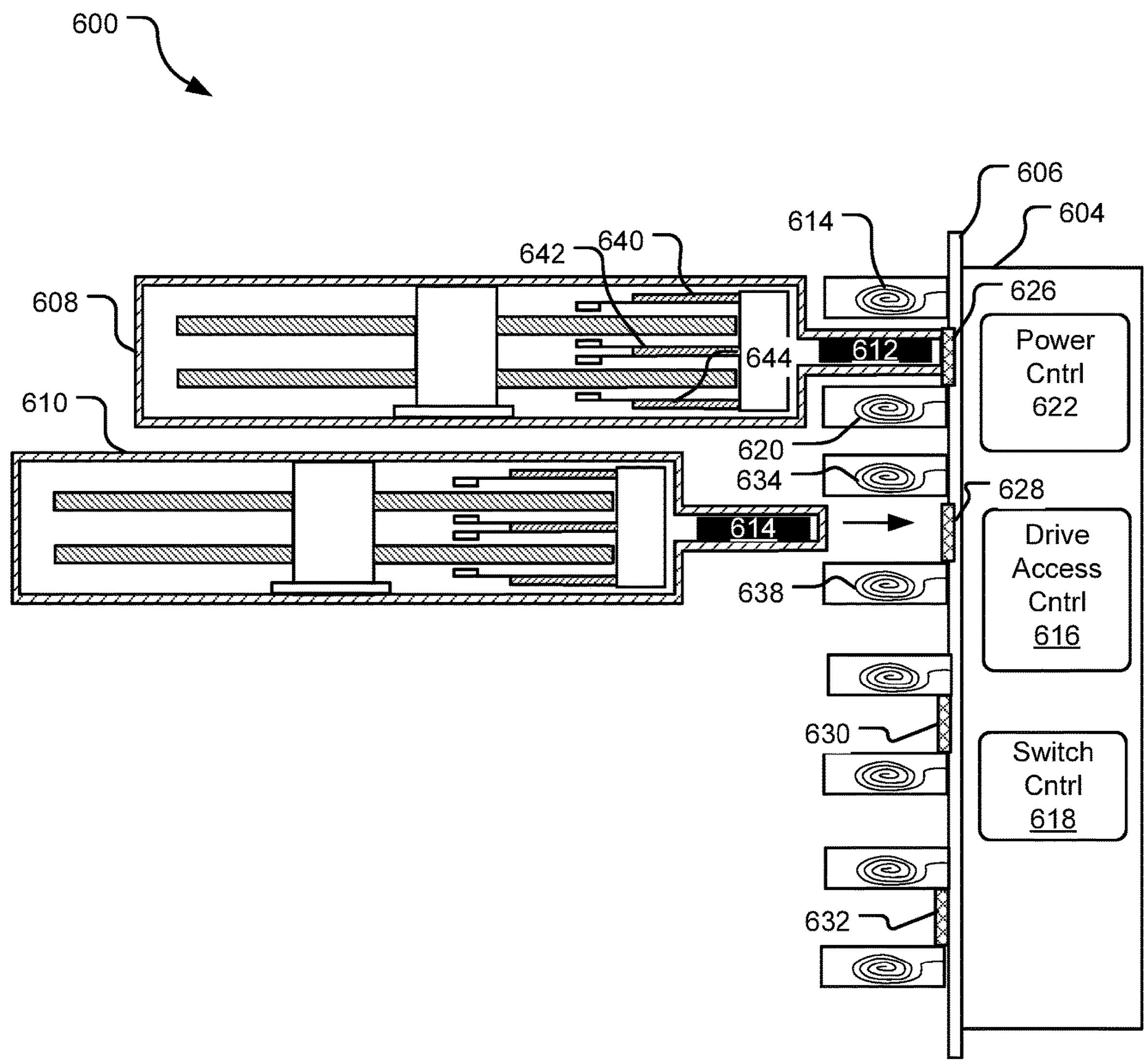
FIG. 6 illustrates a cross-sectional view of yet another example media unit including a control board with cartridge-external VCM actuator components for controlling an actuator position in each of a number of portable storage cartridges.

FIG. 6 illustrates a cross-sectional view of another example media unit 600 including a control board 604 with cartridge-external VCM components for selectively controlling an actuator position within each of a number of portable storage cartridges 608, 610.The portable storage cartridges 608, 610 are configured to removably couple to the control board 604 through an associated one of multiple cartridge slots (e.g., slots 628, 630, 632, and 634) formed on an interconnect portion 606 of the control board 604. In contrast to the implementations shown and described elsewhere herein, each storage cartridge in the media unit 600 includes a voice coil motor that includes one internal VCM magnet (e.g., VCM magnets 604, 606) and two external voice coils (e.g., voice coils 614, 620, 634, 638) mounted to the control board 604. Together, these magnets and voice coils are collectively referred to as "VCM actuator components."

The voice coils (e.g., 614, 620, 634, and 638) are mechanically coupled to the control board 604 and electrically coupled to control electronics on the control board (e.g., a drive access controller 616). In one implementation, the voice coils 614, 620, 634, 638, etc. are permanently mounted to the control board 604.

Each of the storage cartridges 608, 610 includes at least one actuator arm (e.g., actuator arms 640, 642, and 644) selectively controlled by a voice coil motor that includes a magnet internal to the associated cartridge and two adjacent external voice coils. For example, the cartridge 608 is shown positioned in slot 626, which rests above a lower voice coil 620 and below an upper voice coil 614. The VCM of the storage cartridge 608 therefore includes the voice coils 614 and 620 in addition to the internal magnet 612. The internal magnet 612 rests between the corresponding external voice coils 614 and 620 when the storage cartridge 608 is coupled to the slot 626. The magnet 612 generates a permanent magnetic field that interacts with the electromagnetic field of the corresponding voice coils 614 and 620 when current is selectively flowed through those voice coils to generate a Lorentz force that pivots an actuator arm within the storage cartridge 608 to a predetermined radial position.

In FIG. 6, the control board 604 includes a drive access controller 616, a switch controller 618, and a power controller 622. Each of these controllers includes hardware and/or software components that perform functions the same or similar to those of like-named components described above with respect to FIG. 2. Aspects of the system 600 not described in detail with respect to FIG. 6 may be the same or similar as described with respect to other implementations herein.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. An apparatus comprising:

a control board including multiple cartridge slots and hardware for removably coupling each of the multiple cartridge slots to an associated storage cartridge; and multiple voice coil motor (VCM) actuator components including multiple magnets mounted to the control board, each of the multiple magnets generating a magnetic field that contributes to an electromagnetic interaction that drives movement of an actuator arm of a storage cartridge coupled to one of the multiple cartridge slots.

2. The apparatus of claim 1, wherein each of the multiple magnets is being positioned between an adjacent two of the multiple cartridge slots and configured to supply magnetic flux to power at least one voice coil motor receiving an electrical signal through one of the adjacent two of the multiple cartridge slots.

3. The apparatus of claim 2, wherein each one of the multiple magnets is configured to supply magnetic flux to power two different voice coil motors each receiving an electrical signal through a different one of the adjacent two of the multiple cartridge slots.

4. The apparatus of claim 2, wherein the control board further includes control circuitry configured to:

determine a direction of magnetic flux passing through a select slot of the multiple cartridge slots based on a physical index position of the select slot; and generate a voice coil signal for a cartridge coupled to the select slot based on the physical index position of the select slot.

5. The apparatus of claim 4, where the voice coil signal actuates an actuator arm of a storage cartridge coupled to the select slot to a predefined position relative to a magnetic disc within the storage cartridge.

6. The apparatus of claim 1, wherein the multiple VCM actuator components include multiple voice coils permanently mounted to the control board.

7. The apparatus of claim 2, wherein the control board includes a controller that generates the voice coil signal to propagate in a first direction when the physical index position of the select slot is included within a first plurality of the multiple cartridge slots and generates the voice coil signal to propagate in a second opposite direction when the physical index position of the select slot is included within a second plurality of the multiple cartridge slots, the first plurality of the multiple cartridge slots being interlaced with the second plurality of the multiple cartridge slots.

8. The apparatus of claim 1, further comprising:

multiple cartridges each coupled to an associated one of the multiple cartridge slots, each of the multiple cartridges including at least one disc and one actuator arm that is independently controllable relative to an actuator arm of each other one of the multiple cartridges.

9. A method comprising:

receiving, at a control board, a drive access command identifying a logical address for a read or write operation, the control board including multiple cartridge slots and hardware for coupling each of multiple storage cartridges to an associated one of the multiple cartridge slots;

identifying, based on the logical address, a target cartridge of the multiple storage cartridges; and transmitting a voice coil control signal from the control board to the target cartridge through a target slot of the multiple cartridge slots, the target cartridge having a voice coil motor (VCM) driven by the voice coil control signal and a magnetic field generated by a pair of magnets mounted on the control board at a position external to the target cartridge.

10. The method of claim 9, wherein each individual magnet mounted to the control board generates a magnetic field that contributes to magnetic fields driving two different voice coil motors (VCM) each receiving an electrical signal through one of two adjacent slots of the multiple cartridge slots.

11. The method of claim 9, further comprising:

generating the voice coil control signal to propagate in a direction that is based on a physical index position of the target slot.

12. The method of claim 9, wherein generating the voice coil control signal further comprises:

generating the voice coil control signal to propagate in a first direction when the physical index position of the target slot is included within a first plurality of the multiple cartridge slots and to propagate in a second opposite direction when the physical index position of the target slot is included within a second plurality of the multiple cartridge slots, the first plurality of the multiple cartridge slots being interlaced with the second plurality of the multiple cartridge slots.

13. The method of claim 9, wherein the control board includes a controller that implements a power management rule prohibiting data access to more than a predetermined number of the multiple storage cartridges at a time.

14. The method of claim 9, wherein each of the multiple storage cartridges has a housing consisting of non-magnetic material.

15. A system comprising: a control board including:

multiple slots each coupled to an associated one of multiple storage devices;

multiple magnets coupled to the control board, each one of the multiple magnets being positioned between an adjacent two of the multiple slots and configured to supply magnetic flux to power at least one voice coil motor receiving an electrical signal through one of the adjacent two slots; and shared control circuitry configured to selectively transmit a voice coil signal to a target slot of the multiple slots, the voice coil signal being generated based on a physical index of the slot.

16. The system of claim 15, wherein each one of the multiple magnets is configured to supply magnetic flux to power two different voice coil motors each receiving an electrical signal through a different one of the adjacent two of the multiple slots.

17. The system of claim 15, wherein the shared control circuitry implements a power management rule that prohibits simultaneous access to more than a predetermined number of storage devices coupled the control board.

18. The system of claim 15, wherein the shared control circuitry generates the voice coil signal to propagate in a first direction when a physical index position of the target slot is included within a first plurality of multiple slots and generates the voice coil signal to propagate in a second opposite direction when the physical index position of the target slot is included within a second plurality of multiple slots, the first plurality of multiple slots being interlaced with the second plurality of multiple slots.

19. The system of claim 15, where the voice coil signal is operable to actuate an actuator arm of a target storage device to a predefined read or write position relative to a disc within the target storage device.

20. The system of claim 15, wherein each of the multiple storage devices includes at least one disc and an actuator arm that is independently controllable relative to an actuator arm of each other one of the multiple storage devices.

* * * * *